(12) United States Patent
Tadauchi et al.

(10) Patent No.: US 12,464,106 B2
(45) Date of Patent: Nov. 4, 2025

(54) THREE-DIMENSIONAL DISPLAY DEVICE, IMAGE DISPLAY SYSTEM, AND MOVABLE BODY

(71) Applicant: KYOCERA Corporation, Kyoto (JP)

(72) Inventors: Ryo Tadauchi, Otsu (JP); Takashi Shimada, Otsu (JP); Kenji Ogura, Ritto (JP); Kaoru Kusafuka, Tokyo (JP); Mitsuhiro Murata, Yao (JP)

(73) Assignee: KYOCERA Corporation, Kyoto (JP)

( * ) Notice: Subject to any disclaimer, the term of this patent is extended or adjusted under 35 U.S.C. 154(b) by 29 days.

(21) Appl. No.: 18/265,775

(22) PCT Filed: Dec. 9, 2021

(86) PCT No.: PCT/JP2021/045414
§ 371 (c)(1),
(2) Date: Jun. 7, 2023

(87) PCT Pub. No.: WO2022/131137
PCT Pub. Date: Jun. 23, 2022

(65) Prior Publication Data
US 2024/0121374 A1  Apr. 11, 2024

(30) Foreign Application Priority Data
Dec. 14, 2020 (JP) .................. 2020-207062

(51) Int. Cl.
*H04N 13/376* (2018.01)
*H04N 13/31* (2018.01)
*H04N 13/383* (2018.01)
*H04N 13/398* (2018.01)

(52) U.S. Cl.
CPC ........... *H04N 13/31* (2018.05); *H04N 13/383* (2018.05); *H04N 13/398* (2018.05)

(58) Field of Classification Search
CPC .... H04N 13/31; H04N 13/383; H04N 13/398; H04N 13/366; H04N 13/363; G02B 2027/0134; G02B 30/30; G02B 27/0101
USPC .......................................... 345/54
See application file for complete search history.

(56) References Cited

U.S. PATENT DOCUMENTS

| | | | |
|---|---|---|---|
| 6,377,295 B1 * | 4/2002 | Woodgate | H04N 13/305 348/E13.043 |
| 2004/0165263 A1 * | 8/2004 | Sudo | H04N 13/31 359/462 |
| 2006/0087556 A1 * | 4/2006 | Era | H04N 13/361 348/51 |
| 2012/0162762 A1 | 6/2012 | Takahashi | |
| 2012/0182407 A1 * | 7/2012 | Yoshida | G03B 35/18 348/54 |

(Continued)

FOREIGN PATENT DOCUMENTS

JP  2012-141331 A  7/2012

*Primary Examiner* — Gims S Philippe
(74) *Attorney, Agent, or Firm* — Procopio, Cory, Hargreaves & Savitch LLP

(57) ABSTRACT

A three-dimensional display device includes a display, a barrier, and a controller. The display displays a parallax image including a right-eye viewing image and a left-eye viewing image. The barrier defines a traveling direction of image light of the parallax image. The controller causes a black image to appear between the right-eye viewing image and the left-eye viewing image based on a parallax value of the parallax image.

6 Claims, 8 Drawing Sheets

(56) References Cited

U.S. PATENT DOCUMENTS

2013/0069864 A1\* 3/2013 Hirooka ............... H04N 13/117
 345/156
2019/0088702 A1\* 3/2019 Kanda ................... H04N 23/73
2019/0265492 A1\* 8/2019 Yuuki ................... H04N 13/31
2021/0409676 A1\* 12/2021 Kusafuka .............. H04N 13/31

\* cited by examiner

THREE-DIMENSIONAL DISPLAY DEVICE, IMAGE DISPLAY SYSTEM, AND MOVABLE BODY

TECHNICAL FIELD

The present disclosure relates to a three-dimensional (3D) display device, an image display system, and a movable body.

BACKGROUND OF INVENTION

A known technique is described in, for example, Patent Literature 1.

CITATION LIST

Patent Literature

Patent Literature 1: Japanese Unexamined Patent Application Publication No. 2012-141331

SUMMARY

In an aspect of the present disclosure, a three-dimensional display device includes a display, a barrier, and a controller. The display displays a parallax image including a right-eye viewing image and a left-eye viewing image. The barrier defines a traveling direction of image light of the parallax image. The controller controls the display. The controller causes a black image to appear between the right-eye viewing image and the left-eye viewing image based on a parallax value of the parallax image.

In an aspect of the present disclosure, an image display system includes a display, a barrier, a camera, a detector, and a controller. The display displays a parallax image including a right-eye viewing image and a left-eye viewing image. The barrier defines a traveling direction of image light of the parallax image. The camera captures an image of a face of a user. The detector detects positions of eyes of the user based on the captured image output from the camera. The controller controls the display based on the positions of the eyes of the user detected by the detector. The controller causes a black image to appear between the right-eye viewing image and the left-eye viewing image based on a parallax value of the parallax image.

In an aspect of the present disclosure, a movable body includes a display, a barrier, a camera, a windshield, a detector, and a controller. The display displays a parallax image including a right-eye viewing image and a left-eye viewing image. The barrier defines a traveling direction of image light of the parallax image. The camera captures an image of a face of a user. The windshield reflects the image light of the parallax image toward eyes of the user. The detector detects positions of the eyes of the user based on the captured image output from the camera. The controller controls the display based on the positions of the eyes of the user detected by the detector. The controller causes a black image to appear between the right-eye viewing image and the left-eye viewing image based on a parallax value of the parallax image.

BRIEF DESCRIPTION OF THE DRAWINGS

The objects, features, and advantages of the present disclosure will become more apparent from the following detailed description and the drawings.

DESCRIPTION OF EMBODIMENTS

As a three-dimensional (3D) display device with the structure that forms the basis of a 3D display device according to one or more embodiments of the present disclosure, a known display device projects, toward the eyes of a user through a parallax barrier, an image to appear on a display panel as a stereoscopic view.

One or more embodiments of the present disclosure will now be described in detail with reference to the drawings. The drawings used herein are schematic and are not drawn to scale relative to the actual size of each component.

Figure 1:
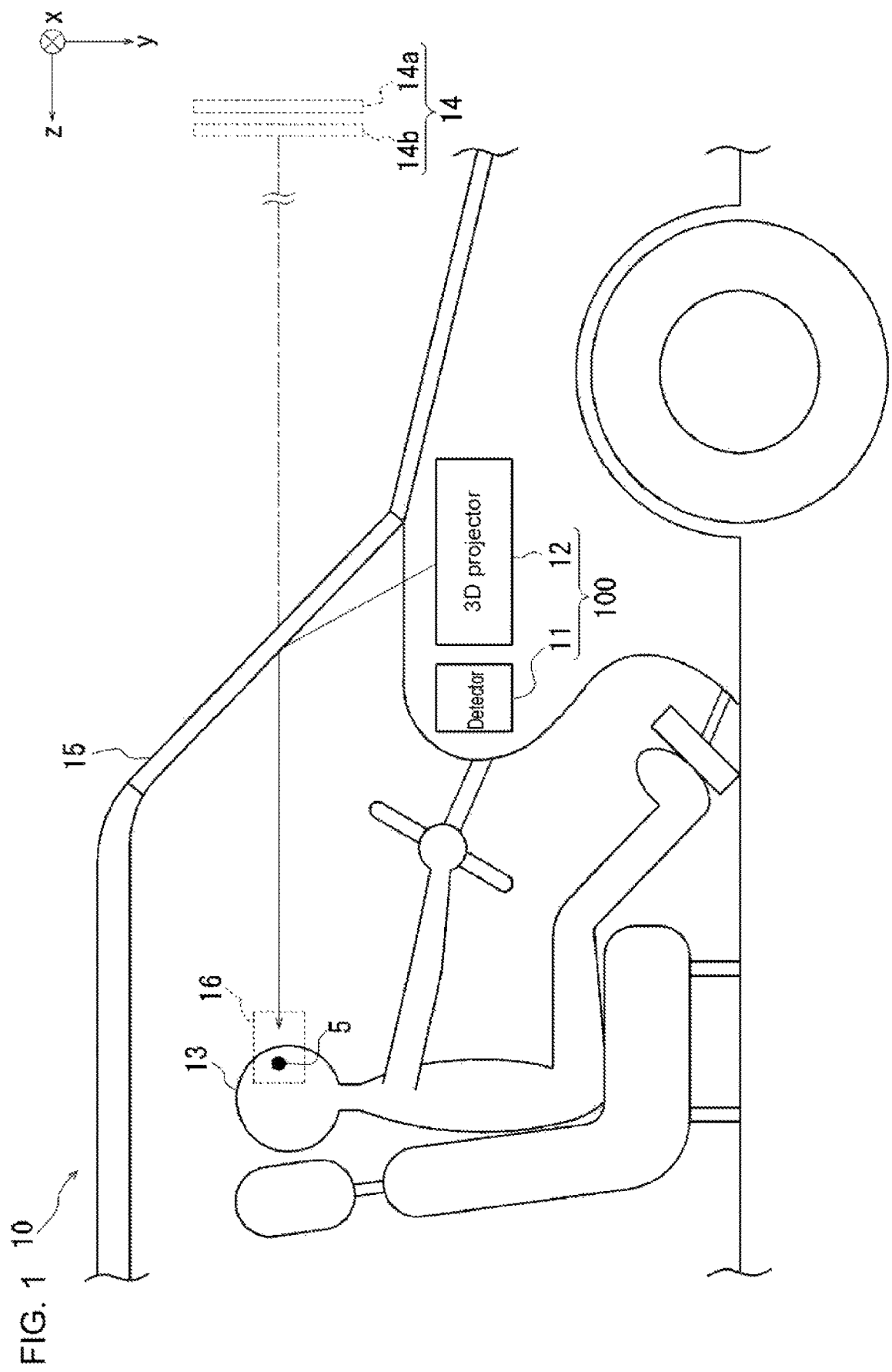
FIG. 1 is a schematic diagram of a movable body according to one embodiment of the present disclosure, illustrating its example structure.

As illustrated in FIG. 1, a movable body 10 according to one embodiment of the present disclosure includes a 3D projection system 100 and an optical member 15. The 3D projection system 100 includes a 3D projector 12. The movable body 10 incorporates the 3D projection system 100 and the 3D projector 12.

The 3D projector 12 may be at any position inside or outside the movable body 10. For example, the 3D projector 12 may be inside the dashboard in the movable body 10. The 3D projector 12 emits image light toward the optical member 15.

The optical member 15 reflects image light emitted from the 3D projector 12. The image light reflected from the optical member 15 reaches an eye box 16. The eye box 16 is an area defined in a real space in which eyes 5 of a user 13 are expected to be located based on, for example, the body shape, posture, and changes in the posture of the user 13. The eye box 16 may have any shape. The eye box 16 may include a two-dimensional (2D) area or a 3D area. The solid arrow in FIG. 1 indicates a path traveled by at least a part of image light emitted from the 3D projector 12 to reach the eye box 16. The path traveled by image light is also referred to as an optical path. With the eyes 5 of the user 13 located in the eye box 16 receiving image light, the user 13 can view a virtual image 14. The virtual image 14 is on the dot-dash line extending frontward from the path extending from the optical member 15 to the eyes 5. The 3D projector 12 can function as a head-up display that allows the user 13 to view the virtual image 14. The optical member 15 may include, for example, a windshield or a combiner. In the present embodiment, the optical member 15 is a windshield. In FIG. 1, the direction in which the eyes 5 of the user 13 are aligned corresponds to x-direction. The vertical direction corresponds to y-direction. The direction orthogonal to x-direction and y-direction corresponds to z-direction.

In one or more embodiments of the present disclosure, examples of the movable body include a vehicle, a vessel, and an aircraft. Examples of the vehicle include an automobile, an industrial vehicle, a railroad vehicle, a community vehicle, and a fixed-wing aircraft traveling on a runway. Examples of the automobile include a passenger vehicle, a truck, a bus, a motorcycle, and a trolley bus. Examples of the industrial vehicle include an industrial vehicle for agriculture and an industrial vehicle for construction. Examples of the industrial vehicle include a forklift and a golf cart. Examples of the industrial vehicle for agriculture include a tractor, a cultivator, a transplanter, a binder, a combine, and a lawn mower. Examples of the industrial vehicle for construction include a bulldozer, a scraper, a power shovel, a crane vehicle, a dump truck, and a road roller. Examples of the vehicle may include human-powered vehicles. The classification of the vehicle is not limited to the above examples. Examples of the automobile include an industrial vehicle travelling on a road. One type of vehicle may fall within multiple classes. Examples of the vessel include a jet ski, a boat, and a tanker. Examples of the aircraft include a fixed-wing aircraft and a rotary-wing aircraft.

The 3D projection system 100 may further include a detector 11 that detects the positions of the eyes 5 of the user 13. The detector 11 detects the positions of the eyes 5 of the user 13 and outputs the detected positions of the eyes 5 to the 3D projector 12. The 3D projector 12 may control, based on the positions of the eyes 5 of the user 13 detected by the detector 11, an image to be projected. The detector 11 may be at any position inside or outside the movable body 10. For example, the detector 11 may be inside the dashboard in the movable body 10. The detector 11 may output, to the 3D projector 12, information indicating the positions of the eyes 5, for example, with wires, wirelessly, or through a controller area network (CAN).

The detector 11 may include an imaging device. The imaging device may include, for example, a charge-coupled device (CCD) image sensor or a complementary metal-oxide semiconductor (CMOS) image sensor. The imaging device can capture an image of the face of the user 13. The imaging range of the imaging device includes the eye box 16. The user 13 may include, for example, the driver of the movable body 10. The detector 11 may detect, based on a captured image generated with the imaging device, the positions of the two eyes of the user 13 in a real space.

The detector 11 may include no imaging device, and may be connected to an imaging device. The detector 11 may include an input terminal for receiving a signal from the imaging device. In this case, the imaging device may be directly connected to the input terminal. The detector 11 may be indirectly connected to the input terminal with a shared network. The detector 11 may detect the positions of the eyes 5 of the user 13 based on an image signal received through the input terminal.

The detector 11 may include, for example, a sensor. The sensor may be, for example, an ultrasonic sensor or an optical sensor. The detector 11 may detect the position of the head of the user 13 with the sensor, and detect the positions of the eyes 5 of the user 13 based on the position of the head. The detector 11 may use two or more sensors to detect the positions of the eyes 5 of the user 13 as coordinates in a 3D space.

Figure 2:
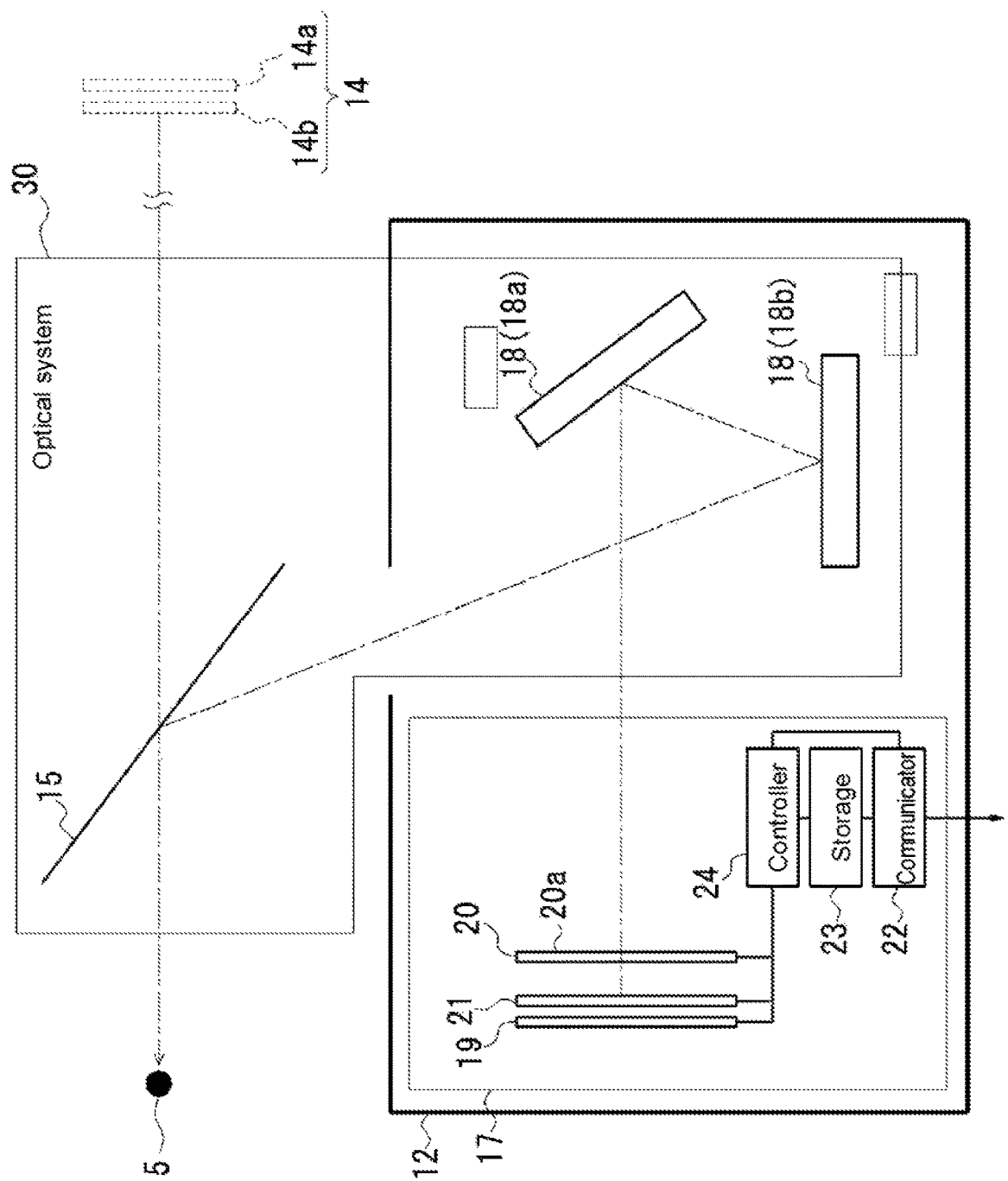
FIG. 2 is a schematic diagram of a 3D projector.

As illustrated in FIG. 2, the 3D projector 12 includes a 3D display device 17 and an optical element 18. The 3D projector 12 is also referred to as an image display module.

The 3D display device 17 includes a backlight 19, a display 20 including a display surface 20a, a barrier 21, and a controller 24. The 3D display device 17 may further include a communicator 22. The 3D display device 17 may further include a storage 23.

The optical element 18 may include a first mirror 18a and a second mirror 18b. At least either the first mirror 18a or the second mirror 18b may have optical power. In the present embodiment, the first mirror 18a is a concave mirror having optical power. The second mirror 18b is a plane mirror. The optical element 18 may function as a magnifying optical system that enlarges an image displayed by the 3D display device 17. The dot-dash arrow in FIG. 2 indicates a path traveled by at least a part of image light emitted from the 3D display device 17 to be reflected from the first mirror 18a and the second mirror 18b and then exit the 3D projector 12. The image light that has exited the 3D projector 12 reaches the optical member 15, is reflected from the optical member 15, and then reaches the eyes 5 of the user 13. This allows the user 13 to view the image displayed by the 3D display device 17.

The optical element 18 and the optical member 15 allow image light emitted from the 3D display device 17 to reach the eyes 5 of the user 13. The optical element 18 and the optical member 15 may form an optical system 30. In other words, the optical system 30 includes the optical element 18 and the optical member 15. The optical system 30 allows image light emitted from the 3D display device 17 to travel along the optical path indicated by the dot-dash line and reach the eyes 5 of the user 13. The optical system 30 may control the traveling direction of image light to magnify or reduce an image viewable by the user 13. The optical system 30 may control the traveling direction of image light to deform an image viewable by the user 13 based on a predetermined matrix.

The optical element 18 may have a structure different from the illustrated structure. The optical element 18 may include a concave mirror, a convex mirror, or a plane mirror. The concave mirror or the convex mirror may be at least partially spherical or aspherical. The optical element 18 may be one element or may include three or more elements, instead of two elements. The optical element 18 may include a lens instead of or in addition to a mirror. The lens may be a concave lens or a convex lens. The lens may be at least partially spherical or aspherical.

The backlight 19 is farther from the user 13 than the display 20 and the barrier 21 along the optical path. In one or more embodiments of the present disclosure, being nearer and farther hereafter refer to being at shorter and longer distances along the optical path. The backlight 19 emits light toward the barrier 21 and the display 20. At least a part of light emitted from the backlight 19 travels along the optical path indicated by the dot-dash line and reaches the eyes 5 of the user 13. The backlight 19 may include a light emitter such as a light-emitting diode (LED), an organic EL element, or an inorganic EL element. The backlight 19 may have any structure that allows control of the light intensity and the light intensity distribution.

The display 20 includes a display panel. The display 20 may be, for example, a liquid-crystal device such as a liquid-crystal display (LCD). In the present embodiment, the display 20 includes a transmissive liquid-crystal display panel. The display 20 is not limited to this, and may include any of various display panels.

The display 20 includes multiple pixels and controls the transmittance of light from the backlight 19 incident on each pixel to emit image light that then reaches the eyes 5 of the user 13. The user 13 views an image formed by image light emitted from each pixel in the display 20.

The barrier 21 defines the traveling direction of incident light. With the barrier 21 nearer the backlight 19 than the display 20 along the optical path, light emitted from the backlight 19 enters the barrier 21 and then enters the display 20. In this case, the barrier 21 blocks or attenuates a part of light emitted from the backlight 19 and transmits another part of the light to the display 20. The display 20 emits incident light traveling in a direction defined by the barrier 21 as image light traveling in the same direction. With the display 20 nearer the backlight 19 than the barrier 21 along the optical path, light emitted from the backlight 19 enters the display 20 and then enters the barrier 21. In this case, the barrier 21 blocks or attenuates a part of image light emitted from the display 20 and transmits another part of the image light to the eyes 5 of the user 13.

The barrier 21 can control the traveling direction of image light, whether the barrier 21 or the display 20 is nearer the user 13. The barrier 21 allows a part of image light emitted from the display 20 to reach one of a left eye 5L and a right eye 5R (refer to FIG. 5) of the user 13, and another part of the image light to reach the other one of the left eye 5L and the right eye 5R of the user 13. The barrier 21 directs at least a part of image light toward the left eye 5L of the user 13 and toward the right eye 5R of the user 13. The left eye 5L is also referred to as a first eye, and the right eye 5R as a second eye. In the present embodiment, the barrier 21 is located between the backlight 19 and the display 20. Light emitted from the backlight 19 first enters the barrier 21, and then travels in a direction defined by the barrier 21 to enter the display 20.

The barrier 21 defines the traveling direction of image light to allow each of the left eye 5L and the right eye 5R of the user 13 to receive different image light, and thus view a different image.

Figure 3:
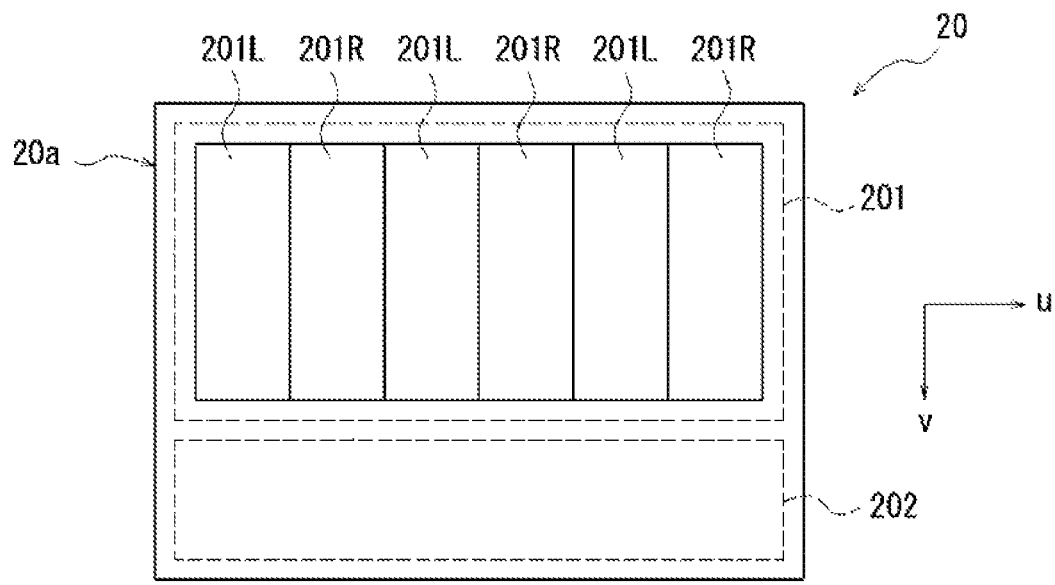
FIG. 3 is a plan view of a display illustrating its example structure.

In the present embodiment, as illustrated in FIG. 3, the display 20 includes a first display area 201 and a second display area 202 on the display surface 20a. The first display area 201 includes left-eye viewing areas 201L viewable by the left eye 5L of the user 13 and right-eye viewing areas 201R viewable by the right eye 5R of the user 13. The display 20 displays a parallax image including left-eye viewing images viewable by the left eye 5L of the user 13 (hereafter, simply referred to as left-eye images) and right-eye viewing images viewable by the right eye 5R of the user 13 (hereafter, simply referred to as right-eye images) on the first display area 201. The parallax image refers to an image projected toward the left eye 5L and the right eye 5R of the user 13 to generate parallax between the two eyes of the user 13. The display 20 displays a left-eye image on the left-eye viewing area 201L and a right-eye image on the right-eye viewing area 201R. In other words, the display 20 displays a parallax image on the left-eye viewing area 201L and the right-eye viewing area 201R. The left-eye viewing areas 201L and the right-eye viewing areas 201R are arranged in u-direction indicating a parallax direction. The left-eye viewing areas 201L and the right-eye viewing areas 201R may extend in v-direction orthogonal to the parallax direction, or in a direction inclined with respect to v-direction at a predetermined angle. In other words, the left-eye viewing areas 201L and the right-eye viewing areas 201R may be arranged alternately in a predetermined direction including a component in the parallax direction. The pitch between the alternating left-eye viewing areas 201L and right-eye viewing areas 201R is also referred to as a parallax image pitch. The left-eye viewing areas 201L and the right-eye viewing areas 201R may be adjacent to each other. The display 20 displays a planar image on the second display area 202. The planar image generates no parallax between the eyes 5 of the user 13 and is not viewed stereoscopically. The second display area 202 may not include distinguishable areas, unlike the first display area 201 including the left-eye viewing area 201L and the right-eye viewing area 201R.

Figure 4:
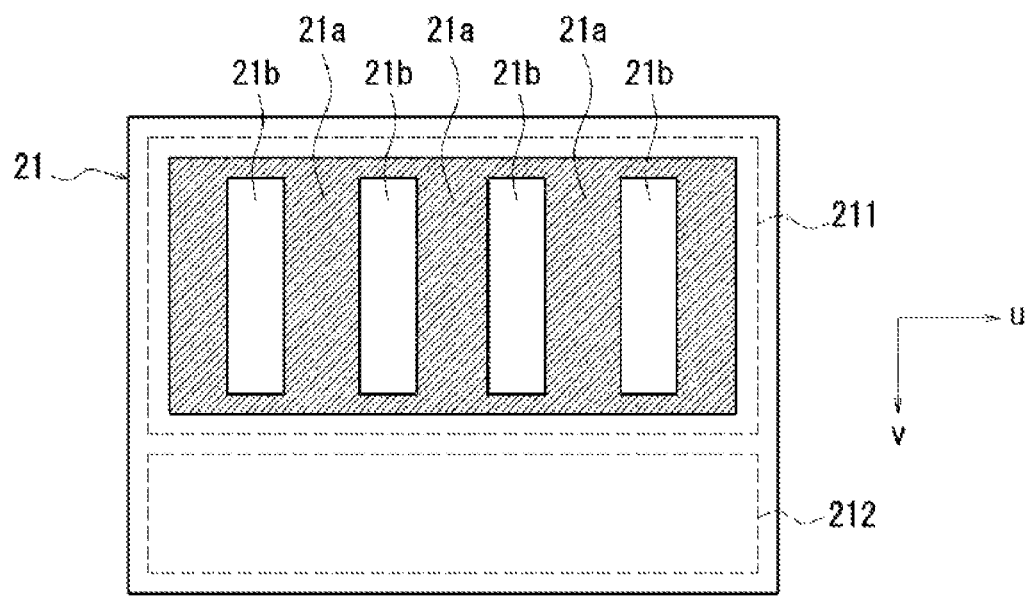
FIG. 4 is a plan view of a barrier illustrating its example structure.

As illustrated in FIG. 4, the barrier 21 includes a first barrier area 211 and a second barrier area 212. The barrier 21 located nearer the user 13 than the display 20 controls the transmittance of image light emitted from the display 20. The first barrier area 211 corresponds to the first display area 201 in the display 20, and controls the transmittance of image light of a parallax image emitted from the first display area 201. The first barrier area 211 includes light-reducing portions 21b and transmissive portions 21a. The transmissive portions 21b transmit light entering the barrier 21 from the display 20. The transmissive portions 21b may transmit light with a transmittance of a first predetermined value or higher. The first predetermined value may be, for example, 100% or a value close to 100%. The light-reducing portions 21a reduce light entering the barrier 21 from the display 20. The light-reducing portions 21a may transmit light with a transmittance of a second predetermined value or lower. The second predetermined value may be, for example, 0% or a value close to 0%. The first predetermined value may be higher than the second predetermined value. The ratio of the second predetermined value to the first predetermined value may be set to $1/100$ in one example. The ratio of the second predetermined value to the first predetermined value may be set to $1/1000$ in another example.

The light-reducing portions 21a and the transmissive portions 21b are arranged alternately in u-direction indicating the parallax direction. The boundaries between the light-reducing portions 21a and the transmissive portions 21b may extend in v-direction orthogonal to the parallax direction as illustrated in FIG. 4, or in a direction inclined with respect to v-direction at a predetermined angle. In other words, the light-reducing portions 21a and the transmissive portions 21b may be arranged alternately in a predetermined direction including a component in the parallax direction.

The shapes of the light-reducing portions 21a and the transmissive portions 21b may be determined based on the shapes of the left-eye viewing areas 201L and the right-eye viewing areas 201R in the display 20. Conversely, the shapes of the left-eye viewing areas 201L and the right-eye viewing areas 201R may be determined based on the shapes of the light-reducing portions 21a and the transmissive portions 21b.

The second barrier area 212 corresponds to the second display area 202 in the display 20, and controls the transmittance of image light of a planar image emitted from the second display area 202. The entire area of the second barrier area 212 may transmit light with a transmittance of a third predetermined value or higher. The third predetermined value may be the same as the first predetermined value, for example, 100%, or a value close to 100%.

In the present embodiment, the barrier 21 is farther from the user 13 than the display 20 along the optical path. The barrier 21 controls the transmittance of light directed from the backlight 19 to the display 20. The transmissive portions 21b transmit light directed from the backlight 19 to the display 20. The light-reducing portions 21a reduce light directed from the backlight 19 to the display 20. This structure allows light entering the first display area 201 to travel in a predetermined direction. Thus, the barrier 21 can control a part of image light to reach the left eye 5L of the user 13, and another part of the image light to reach the right eye 5R of the user 13.

The barrier 21 may include, for example, a transmissive plate and light-reducing members arranged at intervals in the parallax direction on one surface of the transmissive plate. The transmissive plate is a plate member made of a material that transmits light with a transmittance of the first predetermined value or higher. The plate member may be, for example, a plate, a sheet, or a film. The material for the transmissive plate may be, for example, a resin or glass. The light-reducing member is made of a material that transmits light with a transmittance of the second predetermined value or lower. The light-reducing member may be made of, for example, a resin containing a light-absorbing substance being dispersed, glass containing a light-absorbing substance being dispersed, or a metal material. The first barrier area 211 includes a portion including the light-reducing member as the light-reducing portion 21a, and a portion other than the light-reducing portion 21a as the transmissive portion 21b. The barrier 21 may be formed by, for example, attaching, printing, or depositing the light-reducing member by vapor deposition on the surface of the transmissive plate as appropriate for the material of the transmissive member.

The controller 24 controls the display 20. The controller 24 may control the backlight 19. The controller 24 may obtain, from the detector 11, information about the positions of the eyes 5 of the user 13, and control the display 20 or the backlight 19 based on the information. The controller 24 may be, for example, a processor. The controller 24 may include one or more processors. The processors may include a general-purpose processor that reads a specific program and performs a specific function, and a processor dedicated to specific processing. The dedicated processor may include an application-specific integrated circuit (ASIC). The processors may include a programmable logic device (PLD). The PLD may include a field-programmable gate array (FPGA). The controller 24 may be either a system on a chip (SoC) or a system in a package (SiP) in which one or more processors cooperate with other components.

The communicator 22 may include an interface that can communicate with an external device. The external device may include, for example, the detector 11. The communicator 22 may obtain information from the detector 11 and output the information to the controller 24. The interface that can perform communication in the present disclosure may include, for example, a physical connector and a wireless communication device. The physical connector may include an electric connector for transmission with electric signals, an optical connector for transmission with optical signals, and an electromagnetic connector for transmission with electromagnetic waves. The electric connector may include a connector complying with IEC 60603, a connector complying with the USB standard, or a connector used for an RCA terminal. The electric connector may include a connector used for an S terminal specified by EIAJ CP-121aA or a connector used for a D terminal specified by EIAJ RC-5237. The electric connector may include a connector complying with the HDMI (registered trademark) standard or a connector used for a coaxial cable including a British Naval Connector, also known as, for example, a Baby-series N Connector (BNC). The optical connector may include a connector complying with IEC 61754. The wireless communication device may include a wireless communication device complying with the Bluetooth (registered trademark) standard and a wireless communication device complying with other standards including IEEE 802.1a. The wireless communication device includes at least one antenna.

The storage 23 may store various information sets or programs for causing the components of the 3D display device 17 to operate. The storage 23 may include, for example, a semiconductor memory. The storage 23 may function as a work memory for the controller 24. The controller 24 may include the storage 23.

Figure 5:
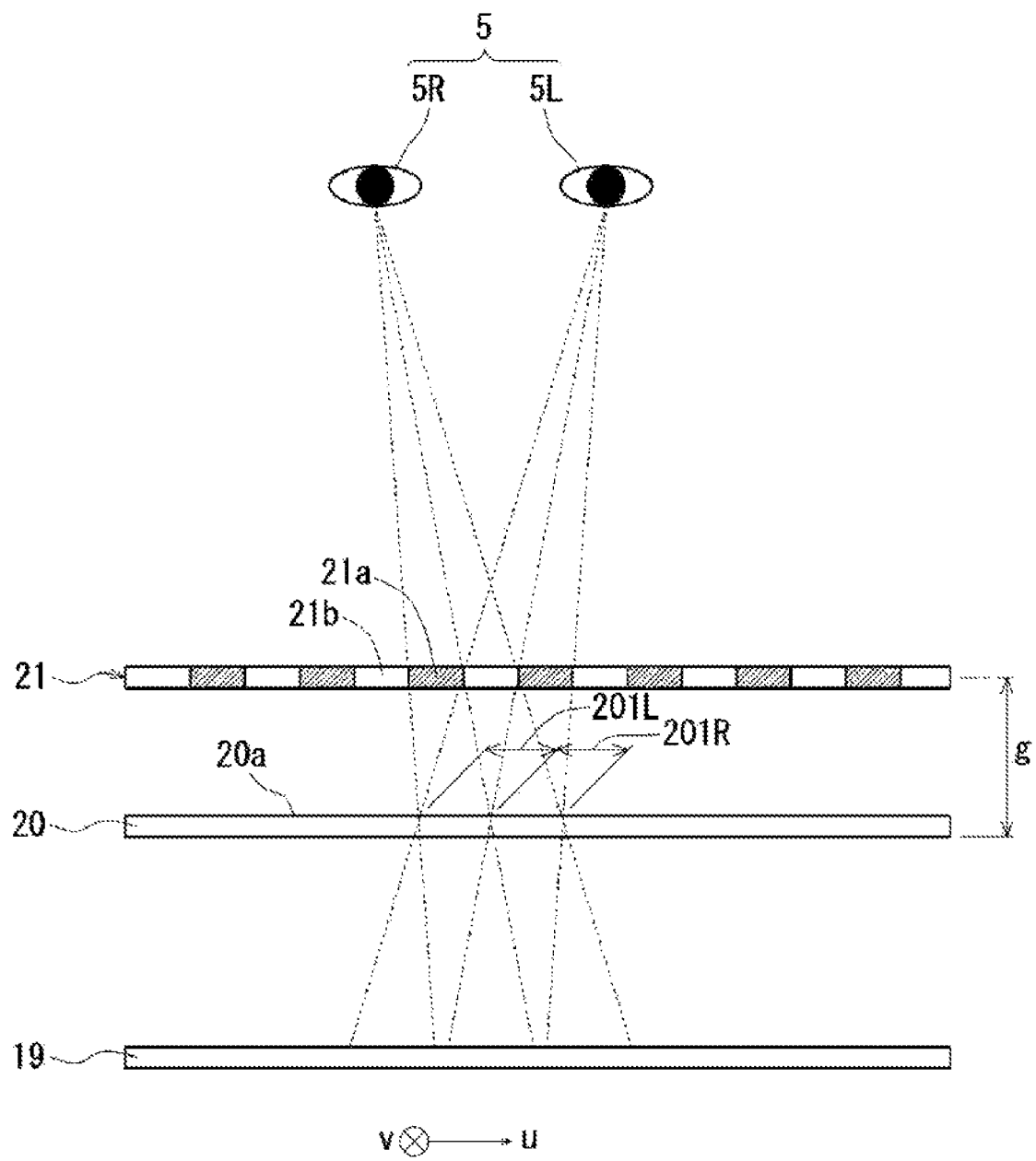
FIG. 5 is a schematic diagram describing the relationship between the eyes of a user, the display, and the barrier.

As illustrated in FIG. 5, light emitted from the backlight 19 passes through the barrier 21 and the display 20 to reach the eyes 5 of the user 13. The broken lines indicate the paths traveled by light from the backlight 19 to reach the eyes 5. Light through the transmissive portions 21b in the barrier 21 to reach the right eye 5R passes through the right-eye viewing areas 201R in the display 20. In other words, the light through the transmissive portions 21b allows the right eye 5R to view the right-eye viewing areas 201R. Light through the transmissive portions 21b in the barrier 21 to reach the left eye 5L passes through the left-eye viewing areas 201L in the display 20. In other words, the light through the transmissive portions 21b allows the left eye 5L to view the left-eye viewing areas 201L.

The display 20 displays right-eye images on the right-eye viewing areas 201R and left-eye images on the left-eye viewing areas 201L. Thus, the barrier 21 allows image light of the left-eye images to reach the left eye 5L and image light of the right-eye images to reach the right eye 5R. More specifically, the transmissive portions 21b allow image light of the left-eye images to reach the left eye 5L of the user 13 and image light of the right-eye images to reach the right eye 5R of the user 13. The 3D display device 17 with this structure can project a parallax image toward the two eyes of the user 13. The user 13 views the parallax image with the left eye 5L and the right eye 5R to view the image stereoscopically.

The planar image appearing on the second display area 202 in the display 20 generates no parallax between the eyes 5 of the user 13. The planar image thus includes no right-eye image and no left-eye image and allows the left eye 5L and the right eye 5R of the user 13 to view the same image.

Light through the transmissive portions 21b in the barrier 21 is emitted from the display surface 20a of the display 20 as image light and reaches the optical member 15 through the optical element 18. The image light is reflected from the optical member 15 and reaches the eyes 5 of the user 13. This allows the eyes 5 of the user 13 to view a second virtual image 14b located farther in the negative z-direction than the optical member 15. The second virtual image 14b corresponds to the image appearing on the display surface 20a. The transmissive portions 21b and the light-reducing portions 21a in the barrier 21 form a first virtual image 14a in front of the optical member 15 and farther in the negative z-direction than the second virtual image 14b. As illustrated in FIG. 1, the user 13 can view an image with the display 20 appearing at the position of the second virtual image 14b and the barrier 21 appearing at the position of the first virtual image 14a.

The 3D display device 17 emits image light of the image appearing on the display surface 20a in a direction defined by the barrier 21. The optical element 18 reflects or refracts the image light to direct the light to the optical member 15. The optical member 15 reflects the image light to direct the light to the eyes 5 of the user 13. The image light entering the eyes 5 of the user 13 causes the user 13 to view a parallax image as the virtual image 14. The user 13 views the virtual image 14 stereoscopically. An image corresponding to the parallax image in the virtual image 14 is also referred to as a parallax virtual image. The parallax virtual image is a parallax image projected through the optical system 30. An image corresponding to the planar image in the virtual image 14 is also referred to as a planar virtual image. The planar virtual image is a planar image projected through the optical system 30.

The user 13 may lose stereoscopic vision with crosstalk caused when the left eye 5L receives parts of the right-eye images or when the right eye 5R receives parts of the left-eye images. Crosstalk degrades the display quality of a parallax image provided to the user 13. The barrier 21 prevents the left-eye images from reaching the right eye 5R and the right-eye images from reaching the left eye 5L. More specifically, the light-reducing portions 21*a* prevent image light of the left-eye images from reaching the right eye 5R of the user 13 and image light of the right-eye images from reaching the left eye 5L of the user 13. This structure allows the user 13 to view left-eye images with the left eye 5L alone and right-eye images with the right eye 5R alone. This reduces crosstalk.

The parallax image appearing on the display 20 includes various parallax images of, for example, a real scene and a pseudo 3D space. Such parallax images may each have a different parallax value. For example, the parallax value is higher for an object at a longer distance and is lower for an object at a shorter distance in a single parallax image. The parallax image may include, for example, text, illustrations, and icons for the user 13 to gaze at. In this case, the parallax value is set as appropriate independently of the distance to the object. Crosstalk is likely to occur in an area with a higher parallax value in the parallax image appearing on the display 20. For example, the parallax image includes an area for displaying an object at a short distance with a relatively low parallax value that allows the barrier 21 to reduce crosstalk, but includes an area for displaying an object at a long distance with a relatively high parallax value that causes crosstalk and degrades the display quality of the parallax image.

In the 3D display device 17 according to the present embodiment, the controller 24 causes a black image to appear between the right-eye image and the left-eye image based on the parallax value of the parallax image. Crosstalk occurs when, for example, the left eye 5L receives a part of the right-eye image. The part of the right-eye image entering the left eye 5L is near the boundary with the adjacent left-eye image. The black image appearing between the right-eye image and the left-eye image allows the right-eye image entering the left eye 5L to be the black image and thus reduces crosstalk. The same applies to the left-eye image partially entering the right eye 5R. A higher parallax value causes a larger part of the right-eye image to enter the left eye 5L, and thus a larger black image appears for a higher parallax value to reduce crosstalk.

When, for example, the parallax image appearing on the display 20 is divided into multiple areas, the parallax value is set for each area. As described above, a relatively high parallax value is set for an area including an object at a long distance, and a relatively low parallax value is set for an area including an object at a short distance.

The right-eye image and the left-eye image may be generated by the controller 24 based on, for example, a single image and distance information (depth information) corresponding to the image. Distance information indicating the distance (depth) from a reference position is set for each object included in the image. The controller 24 calculates a parallax value for each object based on the distance information and generates a right-eye image and a left-eye image based on the calculated parallax value. The controller 24 controls the display 20 to display the generated right-eye image on the right-eye viewing area 201R and the generated left-eye image on the left-eye viewing area 201L.

The right-eye image and the left-eye image may be generated by the controller 24 based on, for example, two images. The two images may be captured simultaneously with a camera with two lenses, such as a stereo camera or with two cameras with different lens positions. The controller 24 extracts the right-eye image from one of the two images and causes the extracted right-eye image to appear on the right-eye viewing area 201R. The controller 24 extracts the left-eye image from the other one of the two images and causes the extracted left-eye image to appear on the left-eye viewing area 201L. The two captured images of the same subject (object) are different. The controller 24 calculates a parallax value based on the differences between the images.

Figure 6A:
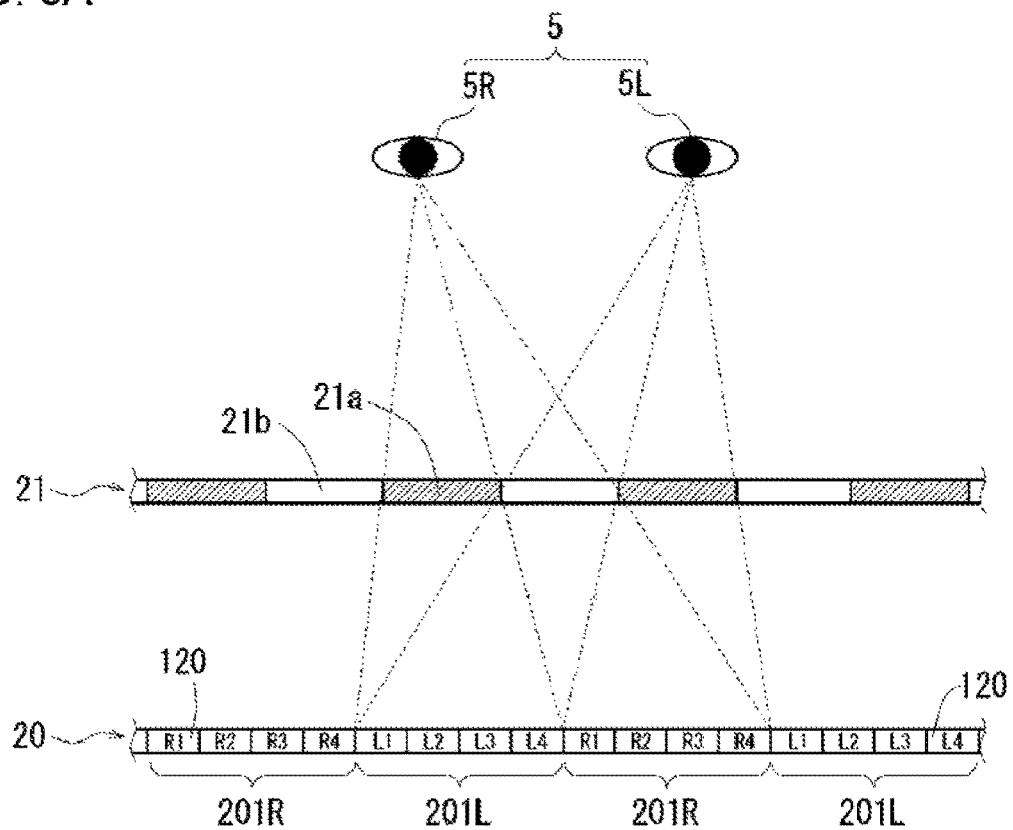
FIG. 6A is a diagram describing a first example of a parallax image.

FIG. 6A is a diagram describing a first example of the parallax image. In the first example, the parallax value is relatively low, and no black image appears. When the parallax value is low, the barrier 21 reduces crosstalk, and no black image may appear. The display 20 includes multiple subpixels 120 arranged in a lattice in u-direction and v-direction orthogonal to u-direction. In the example illustrated in FIG. 6A, the left-eye viewing area 201L and the right-eye viewing area 201R each include four subpixels 120 arranged in u-direction. The four subpixels 120 included in the left-eye viewing area 201L are indicated by L1, L2, L3, and L4. The four subpixels 120 included in the right-eye viewing area 201R are indicated by R1, R2, R3, and R4. The subpixels 120 indicated by L4 and R1 are adjacent to each other, and the subpixels 120 indicated by L1 and R4 are adjacent to each other. The controller 24 causes the four subpixels 120 indicated by L1, L2, L3, and L4 in the left-eye viewing area 201L to display the generated left-eye image. The controller 24 causes the four subpixels 120 indicated by R1, R2, R3, and R4 in the right-eye viewing area 201R to display the generated right-eye images. The user 13 views the left-eye images with the left eye 5L and the right-eye images with the right eye 5R.

Figure 6B:
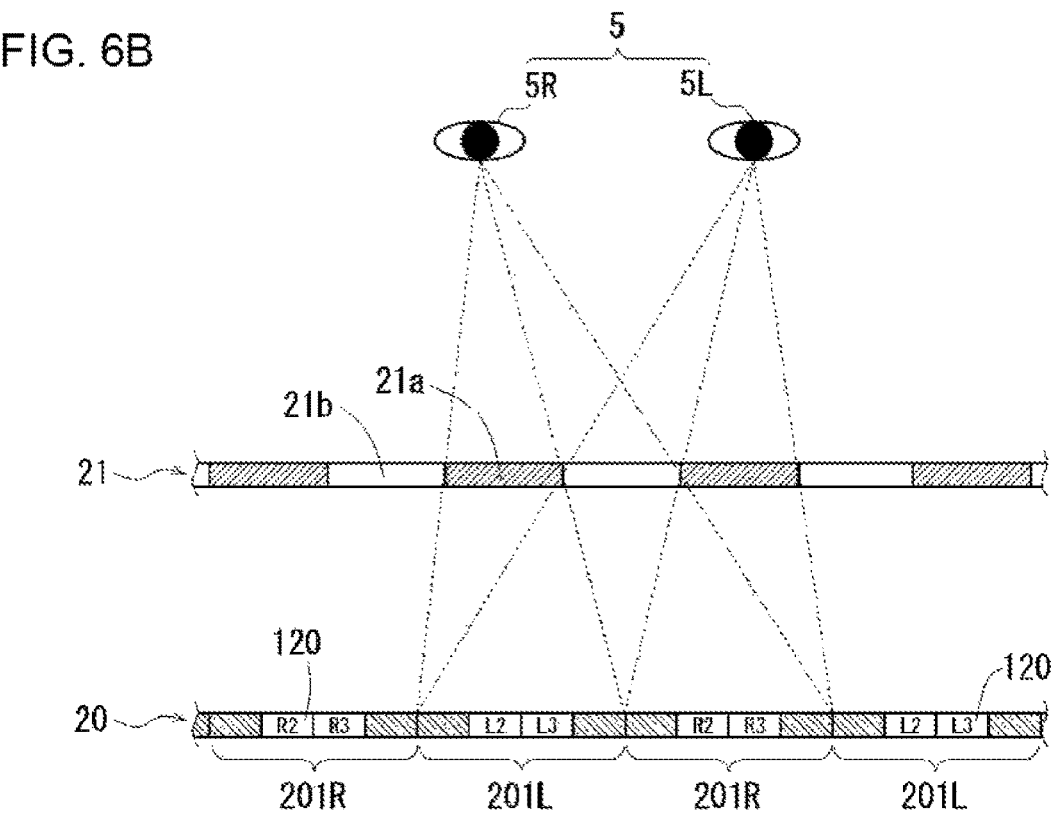
FIG. 6B is a diagram describing a second example of the parallax image.

FIG. 6B is a diagram describing a second example of the parallax image. In the second example, the parallax value is relatively high, and a black image appears. Crosstalk occurs with a high parallax value although the barrier 21 is used. The black image may thus appear. The controller 24 sets the darkest tone for the subpixels 120 included in the left-eye image and adjacent to the right-eye image. The controller 24 sets the darkest tone for the subpixels 120 included in the right-eye image and adjacent to the left-eye image. In the example illustrated in FIG. 6B, the subpixels 120 indicated by L1 and L4 and the subpixels 120 indicated by R1 and R4 have the darkest tones. The subpixels 120 with the darkest tones each have the lowest transmittance of light entering the display 20 and display the black image between the right-eye image and the left-eye image. When the parallax value is high, the subpixels 120 causing crosstalk have the darkest tones to display the black image, reducing crosstalk.

In the second example, two of the four subpixels 120 included in the right-eye image and the left-eye image display the black image. When, for example, the parallax value is higher than in the first example and lower than in the second example, one of the four subpixels 120 included in the right-eye image and the left-eye image may display the black image. When, for example, the parallax value is higher than in the second example, three of the four subpixels 120 included in the right-eye image and the left-eye image may display the black image. Thus, the controller 24 may cause a larger black image to appear for a higher parallax value.

Figure 7:
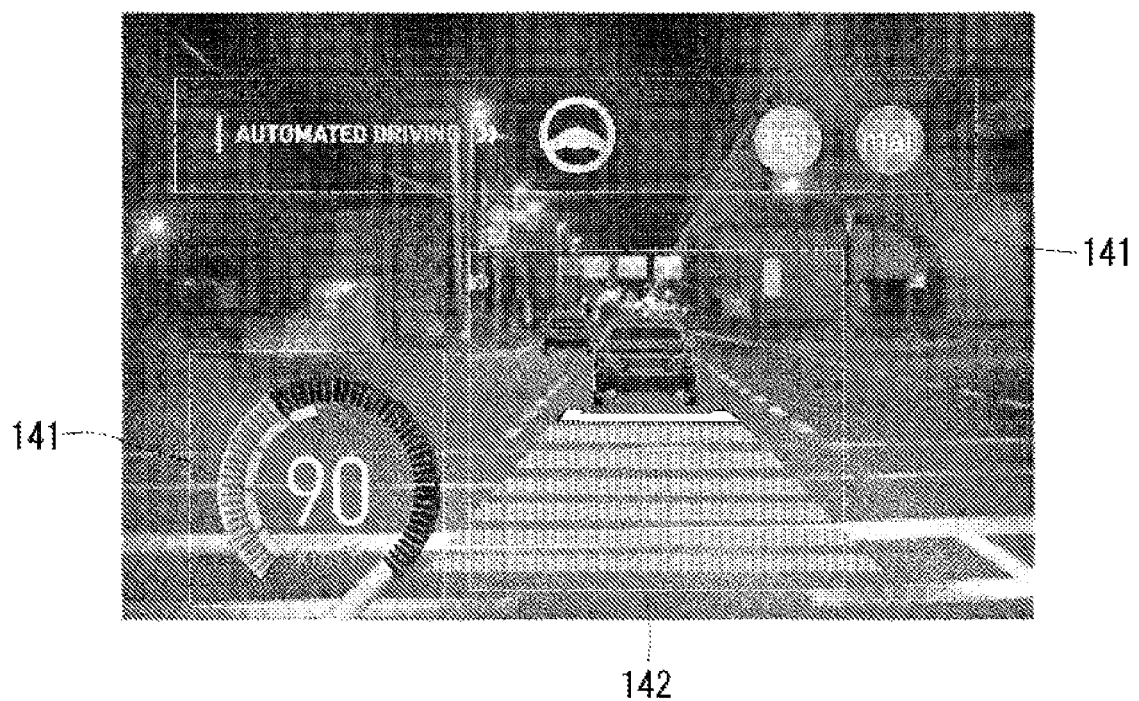
FIG. 7 is a schematic diagram of an example virtual image viewed by the user.

FIG. 7 is a schematic diagram of an example virtual image viewed by the user. In this example, the user 13 being the driver of the movable body 10 views the virtual image 14. The user 13 views a scene in front of the movable body 10 through the windshield and the virtual image 14 overlapping the scene as a parallax virtual image. In this example, the virtual image 14 includes a first area 141 for displaying, for example, an illustration indicating a speedometer and icons representing various information sets, and a second area 142 for displaying an image associated with a real scene such as a line image obtained with a view of a car traveling ahead. An image in the first area 141 may appear toward the user 13 to allow the user 13 to easily gaze at the image. The image in the first area 141 thus has a relatively low parallax value. The image in the first area 141 may have a parallax value of zero. For the parallax value being relatively low or zero, the controller 24 may cause no black image to appear between the right-eye image and the left-eye image as in the first example illustrated in FIG. 6A. The first area 141 may be viewed as a planar virtual image.

The image in the second area 142 is associated with the real scene such as the car traveling ahead, and appears with a different sense of distance. The parallax value differs depending on the distance to an object to be displayed. The parallax value is higher for an object at a longer distance. In the image in the second area 142 with a relatively high parallax value, the controller 24 causes the black image to appear between the right-eye image and the left-eye image as in the second example illustrated in FIG. 6B. The controller 24 may cause a larger black image to appear on the second area 142 for a higher parallax value. For the parallax value being relatively low or zero in the second area 142, the controller 24 may cause no black image to appear between the right-eye image and the left-eye image, in the same or similar manner as with the first area 141.

The control performed by the display 20 based on the positions of the eyes 5 of the user 13 will now be described. The 3D projector 12 may control, based on the positions of the eyes 5 of the user 13 detected by the detector 11, an image to be projected. When the positions of the eyes 5 of the user 13 change, the controller 24 changes the images to appear on the left-eye viewing area 201L and the right-eye viewing area 201R in the display 20. In the example illustrated in FIG. 6A, the left-eye viewing area 201L includes the four subpixels 120 indicated by L1, L2, L3, and L4, and the right-eye viewing area 201R includes the four subpixels 120 indicated by R1, R2, R3, and R4. The reference position is between L2 and L3 or the center position of the left-eye image, or between R2 and R3 or the center position of the right-eye image. When the positions of the eyes 5 of the user 13 detected by the detector 11 are within a predetermined range including a position corresponding to the reference position, the controller 24 maintains the images to appear on the left-eye viewing area 201L and the right-eye viewing area 201R. When the positions of the eyes 5 of the user 13 detected by the detector 11 shift out of the predetermined range, the controller 24 changes the images to appear on the left-eye viewing area 201L and the right-eye viewing area 201R.

For example, when the black image to appear based on the parallax value has a size of a single subpixel, the controller 24 causes the subpixel 120 indicated by L1 to display the black image, and the three subpixels 120 indicated by L2, L3 and L4 to display the left-eye image on the left-eye viewing area 201L. The center position of the left-eye image is the center of the subpixel 120 indicated by L3. Although the reference position with no black image appears between L2 and L3, the reference position at which the black image appears shifts to the center of the subpixel 120 indicated by L3. When the black image appears, the controller 24 may set a predetermined range based on the shifted reference position and control the images to appear on the left-eye viewing area 201L and the right-eye viewing area 201R based on the positions of the eyes 5 of the user 13 detected by the detector 11.

Figure 8:
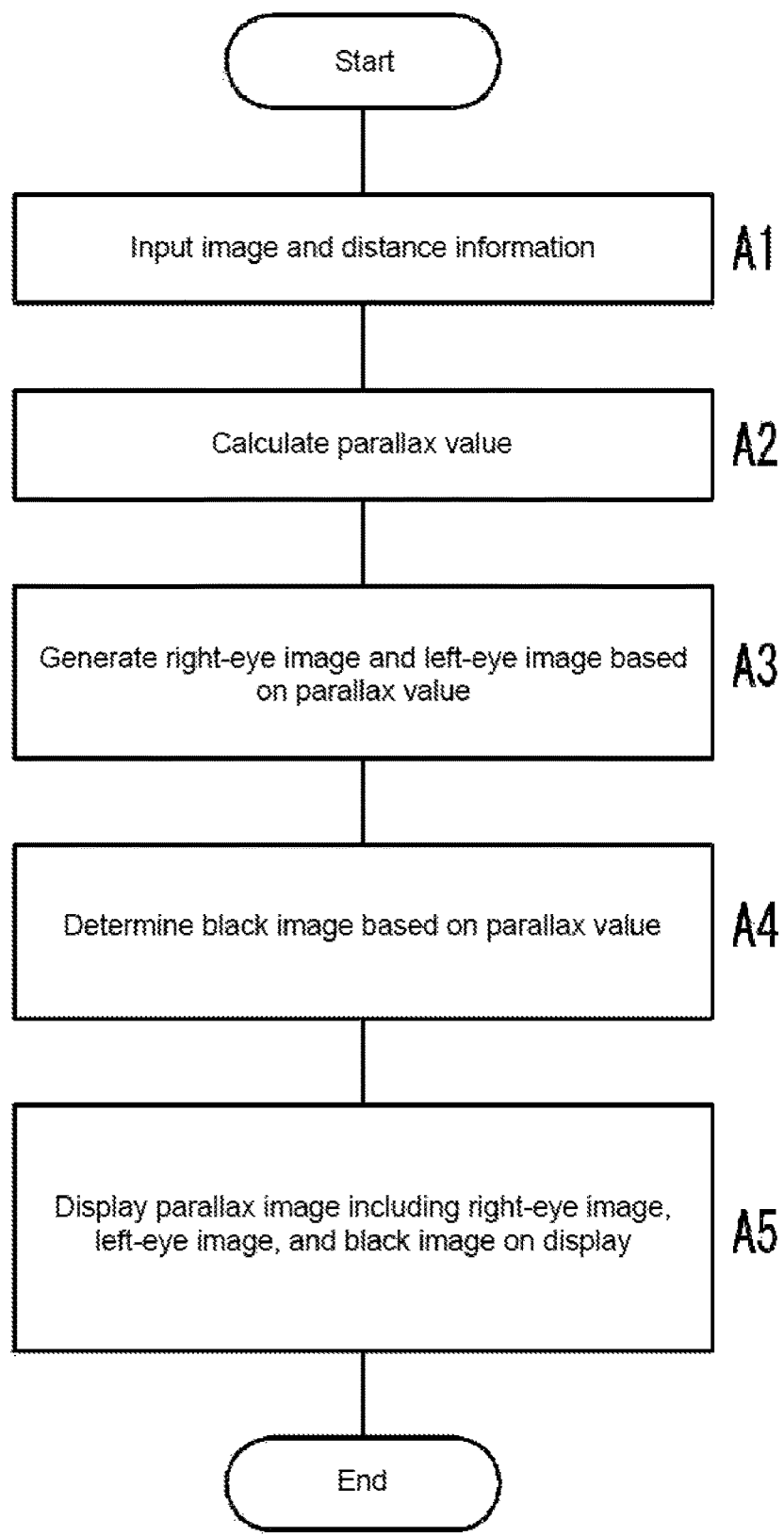
FIG. 8 is a flowchart of an example parallax image display process.

FIG. 8 is a flowchart of an example parallax image display process. This process is performed when the controller 24 causes the display 20 to display a single parallax image. The display process is performed repeatedly for each parallax image to appear. When an image including an object and distance information associated with the object are input in step A1, the controller 24 calculates a parallax value for the object based on the distance information in step A2. When the image includes multiple objects, a parallax value is calculated for each object. In step A3, the controller 24 generates a right-eye image and a left-eye image based on the calculated parallax value. In step A4, the controller 24 determines a black image based on the parallax value. In step A5, the controller 24 causes the display 20 to display a parallax image including the right-eye image, the left-eye image, and the black image.

Figure 9:
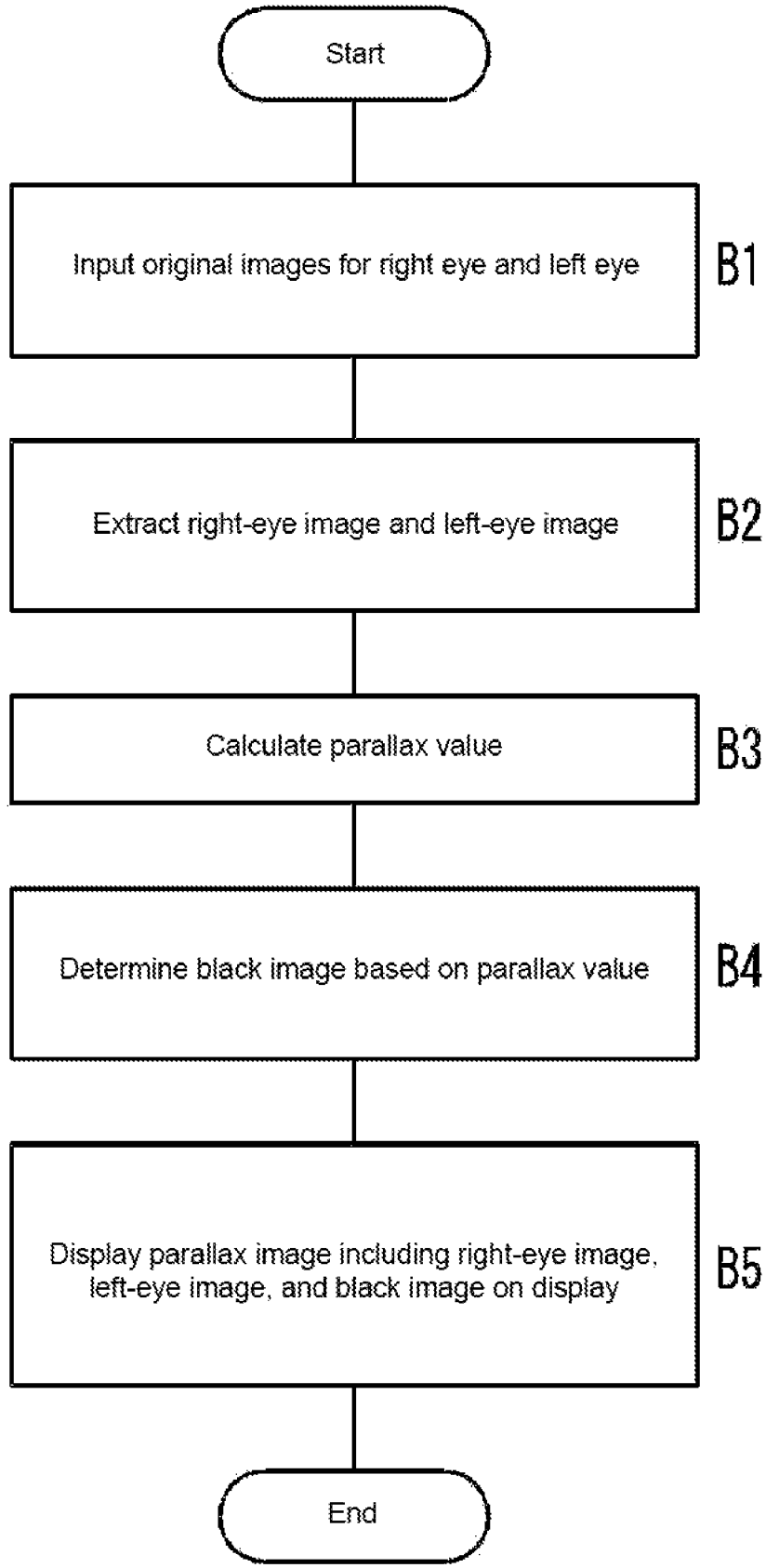
FIG. 9 is a flowchart of another example parallax image display process.

FIG. 9 is a flowchart of another example parallax image display process. This process is performed when the controller 24 causes the display 20 to display a single parallax image. The display process is performed repeatedly for each parallax image to appear. When an original image for the right eye and an original image for the left eye are input in step B1, the controller 24 extracts a right-eye image and a left-eye image from the original image for the right-eye and the original image for the left-eye based on the shapes of the left-eye viewing area 201L and the right-eye viewing area 201R in step B2. In step B3, the controller 24 compares the extracted right-eye image and left-eye image to calculate a parallax value. In step B4, the controller 24 determines a black image based on the parallax value. In step B5, the controller 24 causes the display 20 to display a parallax image including the right-eye image, the left-eye image, and the black image.

In the present disclosure, the first, the second, and others are identifiers for distinguishing the components. The identifiers of the components distinguished with the first, the second, and others in the present disclosure are interchangeable. For example, the first eye can be interchangeable with the second eye. The identifiers are to be interchanged together. The components for which the identifiers are interchanged are also to be distinguished from one another. The identifiers may be eliminated. The components without such identifiers can be distinguished with reference numerals. The identifiers such as first and second in the present disclosure alone should not be used to determine the orders of the components or to determine the existence of smaller or larger number identifiers.

In the present disclosure, x-axis, y-axis, and z-axis are used for ease of explanation and may be interchangeable with one another. The orthogonal coordinate system including x-axis, y-axis, and z-axis is used to describe the structures according to the present disclosure. The positional relationship between the components in the present disclosure is not limited to being orthogonal.

The present disclosure may be implemented in the following forms.

In one or more embodiments of the present disclosure, a three-dimensional display device includes a display, a barrier, and a controller. The display displays a parallax image including a right-eye viewing image and a left-eye viewing image. The barrier defines a traveling direction of image light of the parallax image. The controller controls the display. The controller causes a black image to appear between the right-eye viewing image and the left-eye viewing image based on a parallax value of the parallax image.

In one or more embodiments of the present disclosure, an image display system includes a display, a barrier, a camera, a detector, and a controller. The display displays a parallax image including a right-eye viewing image and a left-eye viewing image. The barrier defines a traveling direction of image light of the parallax image. The camera captures an image of a face of a user. The detector detects positions of eyes of the user based on the captured image output from the camera. The controller controls the display based on the positions of the eyes of the user detected by the detector. The controller causes a black image to appear between the right-eye viewing image and the left-eye viewing image based on a parallax value of the parallax image.

In one or more embodiments of the present disclosure, a movable body includes a display, a barrier, a camera, a windshield, a detector, and a controller. The display displays a parallax image including a right-eye viewing image and a left-eye viewing image. The barrier defines a traveling direction of image light of the parallax image. The camera captures an image of a face of a user. The windshield reflects the image light of the parallax image toward eyes of the user. The detector detects positions of the eyes of the user based on the captured image output from the camera. The controller controls the display based on the positions of the eyes of the user detected by the detector. The controller causes a black image to appear between the right-eye viewing image and the left-eye viewing image based on a parallax value of the parallax image.

The 3D display device according to one or more embodiments of the present disclosure can reduce crosstalk and display a parallax image with improved display quality.

The image display system according to one or more embodiments of the present disclosure can reduce crosstalk and display a parallax image with improved display quality.

The movable body according to one or more embodiments of the present disclosure can reduce crosstalk and display a parallax image with improved display quality.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS 5 eye (5L: left eye, 5R: right eye)
10 movable body
11 detector
12 3D projector (image display module)
13 user
14 virtual image (14a: first virtual image, 14b: second virtual image)
15 optical member
16 eye box
17 3D display device
18 optical element (18a: first mirror, 18b: second mirror)
19 backlight
20 display (20a: display surface)
201 first display area
201L left-eye viewing area
201R right-eye viewing area
202 second display area
21 barrier (21a: light-reducing portion, 21b: transmissive portion)
211 first barrier area
212 second barrier area
22 communicator
23 storage
24 controller
30 optical system
100 3D projection system
120 subpixel
141 first area
142 second area

The invention claimed is:

1. A three-dimensional display device, comprising:
a display configured to display a parallax image including a right-eye viewing image and a left-eye viewing image;
a barrier configured to define a traveling direction of image light of the parallax image; and
a controller configured to control the display,
wherein the display includes a first area and a second area, the first area and the second area being different from each other in parallax value of the parallax image, and
wherein the controller causes a black image not to appear between the right-eye viewing image in the first area having a lower parallax value of the parallax image, and causes the black image to appear between the right-eye viewing image and the left-eye viewing image in the second area having a higher parallax value of the parallax image.

2. The three-dimensional display device according to claim 1, wherein
the controller causes a larger black image to appear for a higher parallax value.

3. The three-dimensional display device according to claim 1, wherein
the controller causes no black image to appear between the right-eye viewing image and the left-eye viewing image in response to the parallax value being zero.

4. The three-dimensional display device according to claim 1, wherein
the controller replaces at least a part of the right-eye viewing image or a part of the left-eye viewing image with a black image to cause the black image to appear between the right-eye viewing image and the left-eye viewing image.

5. An image display system, comprising:
a display configured to display a parallax image including a right-eye viewing image and a left-eye viewing image;
a barrier configured to define a traveling direction of image light of the parallax image;
a camera configured to capture an image of a face of a user;
a detector configured to detect positions of eyes of the user based on the captured image output from the camera; and
a controller configured to control the display based on the positions of the eyes of the user detected by the detector, wherein the display includes a first area and a second area, the first area and the second area being different from each other in parallax value of the parallax image, and wherein the controller causes a black image not to appear between the right-eye viewing image in the first area having a lower parallax value of the parallax image, and causes the black image to appear between the right-eye viewing image and the left-eye viewing image in the second area having a higher parallax value of the parallax image.

6. A movable body, comprising:

a display configured to display a parallax image including a right-eye viewing image and a left-eye viewing image;

a barrier configured to define a traveling direction of image light of the parallax image;

a camera configured to capture an image of a face of a user;

a windshield configured to reflect the image light of the parallax image toward eyes of the user;

a detector configured to detect positions of the eyes of the user based on the captured image output from the camera; and a controller configured to control the display based on the positions of the eyes of the user detected by the detector, wherein the display includes a first area and a second area, the first area and the second area being different from each other in parallax value of the parallax image, and wherein the controller causes a black image not to appear between the right-eye viewing image in the first area having a lower parallax value of the parallax image, and causes the black image to appear between the right-eye viewing image and the left-eye viewing image in the second area having a higher parallax value of the parallax image.

* * * * *